US012006472B2

(12) United States Patent
Ruan et al.

(10) Patent No.: US 12,006,472 B2
(45) Date of Patent: Jun. 11, 2024

(54) DISTILLATION SYSTEM AND METHOD USING MICROWAVE-ASSISTED PYROLYSIS

(71) Applicant: Resynergi, Inc., Rohnert Park, CA (US)

(72) Inventors: Rongsheng Ruan, Arden Hills, MN (US); Erik Anderson, Maplewood, MN (US)

(73) Assignee: Resynergi, Inc., Rohnert Park, CA (US)

( * ) Notice: Subject to any disclaimer, the term of this patent is extended or adjusted under 35 U.S.C. 154(b) by 0 days.

(21) Appl. No.: 18/105,503

(22) Filed: Feb. 3, 2023

(65) Prior Publication Data

US 2023/0227728 A1 Jul. 20, 2023

Related U.S. Application Data

(63) Continuation of application No. 17/498,287, filed on Oct. 11, 2021, now Pat. No. 11,591,523, which is a
(Continued)

(51) Int. Cl.
*B01J 27/224* (2006.01)
*C10B 41/00* (2006.01)
(Continued)

(52) U.S. Cl.
CPC .............. *C10B 41/00* (2013.01); *C10B 19/00* (2013.01); *C10B 55/00* (2013.01); *C10L 1/026* (2013.01);
(Continued)

(58) Field of Classification Search
CPC .. C10L 2290/02; C10L 2290/36; B01J 27/224
See application file for complete search history.

(56) References Cited

U.S. PATENT DOCUMENTS 7,834,226 B2 11/2010 Miller
7,951,270 B2 5/2011 Ludlow-Palafox et al.
(Continued)

FOREIGN PATENT DOCUMENTS

CN 105038837 A * 11/2015 ............. C10G 1/086
CN 107652995 A 2/2018
(Continued)

OTHER PUBLICATIONS

Machine Translation of CN-105038837-A (Year: 2015).*
(Continued)

*Primary Examiner* — Ellen M McAvoy
*Assistant Examiner* — Ming Cheung Po
(74) *Attorney, Agent, or Firm* — Billion & Armitage

(57) ABSTRACT

A method of producing a hydrocarbon fuel from a soapstock includes supplying a pyrolysis reactor that includes a microwave absorbent bed susceptible to microwave irradiation, applying microwave energy to the pyrolysis reactor, wherein the microwave absorbent bed converts the microwave energy to thermal energy, supplying the soapstock to the microwave absorbent bed, and condensing a vapor generated by pyrolysis of the soapstock sufficient to collect the hydrocarbon fuel.

15 Claims, 11 Drawing Sheets

Related U.S. Application Data continuation of application No. 16/389,459, filed on Apr. 19, 2019, now Pat. No. 11,142,700.

(60) Provisional application No. 62/660,306, filed on Apr. 20, 2018.

(51) Int. Cl.
    *C10B 19/00*      (2006.01)
    *C10B 55/00*      (2006.01)
    *C10L 1/02*      (2006.01)

(52) U.S. Cl.
    CPC ... *C10L 2200/0476* (2013.01); *C10L 2290/02* (2013.01); *C10L 2290/06* (2013.01); *C10L 2290/36* (2013.01)

(56) References Cited

U.S. PATENT DOCUMENTS

| | | |
|---|---|---|
| 2012/0029252 A1 | 2/2012 | Lissianski et al. |
| 2014/0020286 A1 | 1/2014 | Doucet et al. |
| 2014/0155661 A1 | 6/2014 | Frediani et al. |
| 2014/0208638 A1 | 7/2014 | Van Thorre et al. |
| 2015/0225652 A1 | 8/2015 | Lei et al. |

FOREIGN PATENT DOCUMENTS

| | | | | |
|---|---|---|---|---|
| CN | 107674698 A | * | 2/2018 | ............... C10G 1/00 |
| WO | WO-2010033512 A1 | * | 3/2010 | ............. C10G 1/086 |

OTHER PUBLICATIONS

Machine Translation of CN-107674698-A (Year: 2018).*
"Machine Translation of CN107652995A", 2018.
"Standard Specification for Biodiesel Fuel Blend Stock (B100) for Middle Distillate Fuels", ASTM D6751-19, ASTM International, 2019, 10 pages.
"Standard Specification for Diesel Fuel Oil, Biodiesel Blend (B6 to B20)", ASTM D7467-19, ASTM International, 2019, 22 pages.
"Standard Test Method for Acid Number of Petroleum Products by Potentiometric Titration", ASTM D664-18e2, ASTM International, 2018, 11 pages.
"Standard Test Method for Analysis of Biodiesel Products by Gas Chromatography-mass Spectrometry", ASTM E2997-16, ASTM International, Mar. 1, 2016, 8 pages.
"Standard Test Method for Determination of Total Monoglycerides, Total Diglycerides, Total Triglycerides, and Free and Total Glycerin in B-100 Biodiesel Methyl Esters by Gas Chromatography", ASTM D6584-13e1, ASTM International, 2013, 9 pages.
"Standard Test Method for Determination of Total Sulfur in Light Hydrocarbons, Spark Ignition Engine Fuel, Diesel Engine Fuel, and Engine Oil by Ultraviolet Fluorescence", ASTM D5453-19, ASTM International, 2019, 11 pages.
Chen, et al., "Microwave-Assisted Thermochemical Conversion of Biomass for Biofuel Production", Production of Biofuels and Chemicals with Microwave, Nov. 25, 2014, pp. 83-98.
Dunn, Robert O, "Other Alternative Diesel Fuels From Vegetable Oils", The Biodiesel Handbook, AOCS Press, 2005, 23 pages.
Fernández, Yolanda, et al., "Microwave Heating Applied to Pyrolysis", INTECH Open Access Publisher, 2011, 1-33.
Green, et al., "Perry's Chemical Engineers' Handbook", Eighth Edition, 2008, 2735 pages.
Kleinova, et al., "Standard Methyl Esters from Used Frying Oils", Fuel, vol. 109, Jul. 2013, pp. 588-596.
Knothe, Gerhard, "Dependence of biodiesel fuel properties on the structure of fatty acid alkyl esters", Fuel Processing Technology, 2005, 1059-1070.
Knothe, Gerhard, et al., "The Biodiesel Handbook", AOCS Press, 2005, 1-286.
KOTRBA, "The Many Faces of Distillation", Biodiesel Magazine, Mar. 12, 2013, 5 pages.
Lam, Su Shiung, et al., "Recovery of diesel-like fuel from waste palm oil by pyrolysis using a microwave heated bed of activated carbon", Energy, 2016, 1-22.
Lee, et al., "Use of Branched-Chain Esters to Reduce the Crystallization Temperature of Biodiesel", Journal of the American Oil Chemists Society, vol. 72, No. 10, 1995, pp. 1155-1160.
Omar, Rozita, et al., "Conventional and microwave-assisted pyrolysis of rapeseed oil for bio-fuel production", Journal of Analytical and Applied Pyrolysis, 2014, 131-134.
Ramasamy, "Study on the FAME Oxidation and Thermal Stability of Biodiesel", Biodiesel Fuels, 2012, 128 pages.
Sheng, et al., "Estimating the Higher Heating Value of Biomass Fuels from Basic Analysis Data", Biomass and Bioenergy, vol. 28, Issue 5, May 2005, pp. 499-507.
Smith, W., "Alternative Feedstock & Process Technology Overview", http://www.biodieselmagazine.com/articles/2070299/alternative-feedstock-process-technology-overview, Sep. 30, 2017.
Wan, et al., "Microwave-Assisted Pyrolysis of Biomass: Catalysts to Improve Product Selectivity", Journal of Analytical and Applied Pyrolysis, vol. 86, Issue 1, Jan. 1, 2009, pp. 161-167.

\* cited by examiner

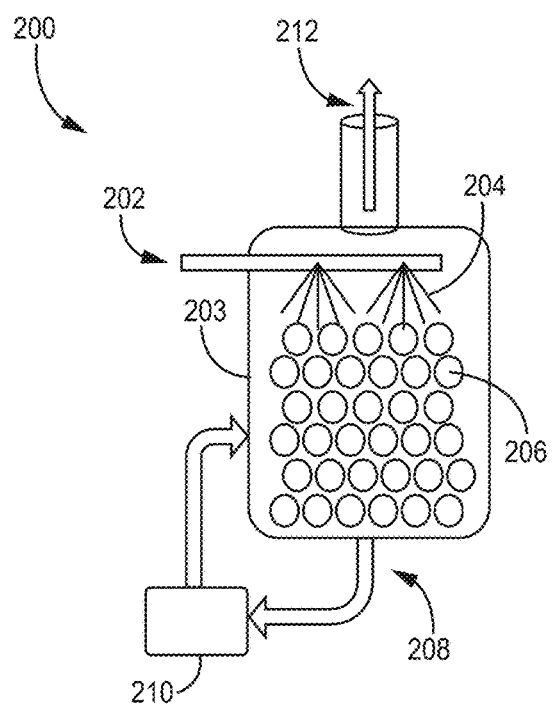 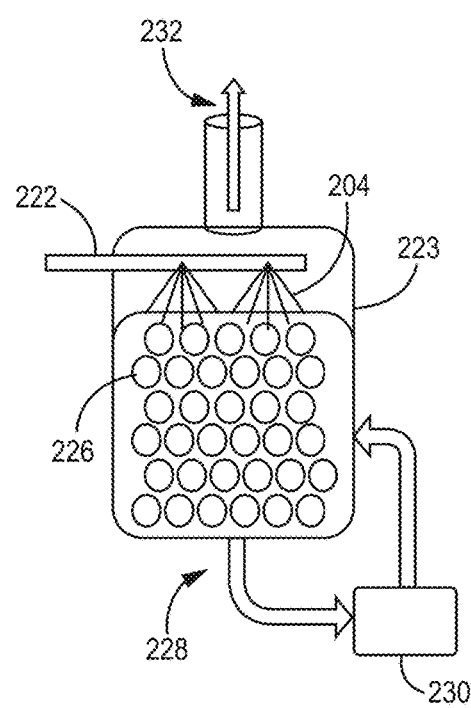
FIG. 2A  FIG. 2B

DISTILLATION SYSTEM AND METHOD USING MICROWAVE-ASSISTED PYROLYSIS

CROSS-REFERENCE TO RELATED APPLICATION

This application is a continuation of U.S. application Ser. No. 17/498,287 filed on Oct. 11, 2021, which is a continuation of U.S. application Ser. No. 16/389,459 filed on Apr. 19, 2019, which claims benefit to U.S. Provisional Patent Application No. 62/660,306 filed on Apr. 20, 2018, the entire disclosure of which is hereby incorporated by reference.

TECHNICAL FIELD

This invention relates generally to distillation systems and methods, and in particular to systems and methods utilizing microwave-assisted pyrolysis.

BACKGROUND

Vacuum distillation is a widely used industrial process. Vacuum distillation of methyl esters for example is a routine, but critical stage in the purification of commercial biodiesel. The process vaporizes methyl esters in a reactor under extremely low pressures (2 mmHg) and temperatures around 230° C. before sending the vapors to a separate container to be condensed to obtain a more pure form. Without distillation, the biofuel is much darker in color and is more susceptible to scrutiny during analytical certification. Vacuum distillation for purification uses a process known as "reflux distillation", where a portion of the condensed, purified methyl esters are returned to the distillation column to interact and purify the rising vapor stream. Although the recycling of product methyl esters allows for better purification, it also significantly increases the vapor load and subsequently increases the energy input of the system. At the low pressures maintained during vacuum distillation, the vapor load (liters/min) of the methyl ester stream is already very large, due to the low gas density at reduced pressures. Full-scale vacuum distillation columns must be very large, relative to non-vacuum systems, to handle typical production capacities. Additional costs innate to designing and building a vacuum distillation system include full-vacuum ratings for all equipment, pumps, and instrumentation.

Heating vacuum distillation systems is traditionally done using a combination of high temperature thermal oil furnace and a series of heat exchangers and reboilers, transferring heat from thermal liquids to the substrate fluids, the methyl esters in this example. These oils can be efficiently used to transfer thermal energy between two liquids, but have upper temperature ranges of a few hundred degrees Celsius. For this reason, low pressures are utilized to increase the expressed vapor pressures of methyl esters at lower temperatures, subsequently increasing the vapor load and system footprint.

Thermal oil systems can be heated by natural gas, which is approximately 7 times cheaper than electricity per unit of energy. Therefore, taking advantage of cheaper heating methods is advantageous whenever possible. However, the relatively slow rate of heat transfer from thermal oil to the substrate of interest can be too slow for certain applications. Applications where extremely high heating rates are required may require electric heating to overcome any energy rate limitations.

During vacuum distillation in this example, a purified stream of methyl esters is generated and removed from the system as a vapor while a secondary stream, distillation bottoms, leaves through the bottom of the reactor. Made up of primarily high molecular weight methyl esters and a combination of concentrated impurities such as free fatty acids, acyl-glycerides, and various color bodies, the distillation bottoms represent a high energy waste stream. It would be beneficial to reduce the formation of these vacuum distillation bottoms.

In addition, it would be beneficial to develop a system and method of recovering the methyl esters from the VDBs to allow the recovered bio-oil to be blended with the commercial biodiesel. That is, it would be beneficial to develop a process that allows for the recovery of useful bio-oils (e.g., methyl esters) from the VDBs currently classified as a waste product associated with biodiesel distillation.

SUMMARY

According to some aspects of the present invention, a distillation apparatus includes a first microwave, a pyrolysis reactor, a microwave-absorbent bed, and a condenser. The pyrolysis reactor is located within the first microwave and configured to receive a liquid input stream and to output a vapor. The microwave-absorbent bed is located within the pyrolysis reactor, wherein the microwave-absorbent bed converts microwave energy provided by the microwave to thermal energy to initiate pyrolysis within the pyrolysis reactor, wherein the pyrolysis reactor provides a vapor output. The condenser is configured to receive the vapor output of the pyrolysis reactor and to cool and condense the vapor into a recoverable product.

According to another aspect. a method of biodiesel distillation includes supplying a liquid input stream to a pyrolysis reactor that includes a microwave-susceptible bed capable of converting microwave energy to thermal energy. The method further includes applying microwave energy to the pyrolysis reactor, wherein the microwave susceptible bed converts the microwave energy to thermal energy to initialize pyrolysis of the liquid input stream. The method further includes condensing a vapor exiting the pyrolysis reactor to collect a distilled biodiesel.

According to another aspect, a method of producing a hydrocarbon fuel from a soapstock includes supplying a pyrolysis reactor that includes a microwave absorbent bed susceptible to microwave irradiation, applying microwave energy to the pyrolysis reactor, wherein the microwave absorbent bed converts the microwave energy to thermal energy, supplying the soapstock to the microwave absorbent bed, and condensing a vapor generated by pyrolysis of the soapstock sufficient to collect the hydrocarbon fuel.

BRIEF DESCRIPTION OF THE DRAWINGS

FIGS. 2A illustrates a diagram of flash microwave-assisted pyrolysis (fMAP), according to some embodiments.

FIGS. 2B illustrates a diagram of distillation microwave-assisted pyrolysis (dMAP), according to some embodiments.

DETAILED DESCRIPTION

According to some embodiments, a microwave-assisted pyrolysis distillation is described herein. The microwave-assisted pyrolysis distillation system may be utilized in both traditional distillation processes and recovery distillation processes (e.g. methyl ester recovery following vacuum distillation of biodiesel production).

The use of vacuum distillation for biodiesel production has become a reliable post-treatment method for removing multiple impurities types, to consistently produce commercial-grade biodiesel. By vacuum distilling the methyl esters in a transesterification process, manufacturers create a transparent, low-sulfur, homogenous fuel with an improved marketability, relative to darker biodiesel. The waste product of biodiesel distillation is vacuum distillation bottoms (VDB), which are mixture of higher molecular weight methyl esters (84%) and derivatives. in some embodiments, the present disclosure is utilized in place of traditional vacuum distillation for biodiesel production. in one embodiment, flash microwave-assisted pyrolysis (fMAP) is utilized, in which a continuous liquid feeding of un-distilled biodiesel is fed onto a dry catalyst bed for "flash" pyrolysis. According to another embodiment, distillation microwave-assisted pyrolysis (dMAP) is utilized, in which a liquid level of un-distilled biodiesel is continuously maintained for distillation pyrolysis. In some embodiments, traditional heating methods are utilized to provide at least part of the heating of the un-distilled biodiesel, and additional energy is provided via the microwave to maintain the un-distilled biodiesel at a desired temperature.

With respect to recovery of methyl esters from VDBs, in some embodiments fast pyrolysis techniques (e.g., microwave-assisted pyrolysis) are utilized to recover the VDBs. In one embodiment, flash microwave-assisted pyrolysis (EMAP) is utilized, in which a continuous liquid feeding of VDBs is fed onto a dry catalyst bed for "flash" pyrolysis. According to another embodiment, distillation microwave-assisted pyrolysis (dMAP) is utilized, in which a liquid level of VDBs is continuously maintained for distillation pyrolysis. Once again, depending on the scale of the recovery process, heating of the VDBs may rely on traditional heating methods to provide at least part of the heating of the VDBs, and additional energy is provided via the microwave to maintain the VDBs at a desired temperature.

Figure 1:
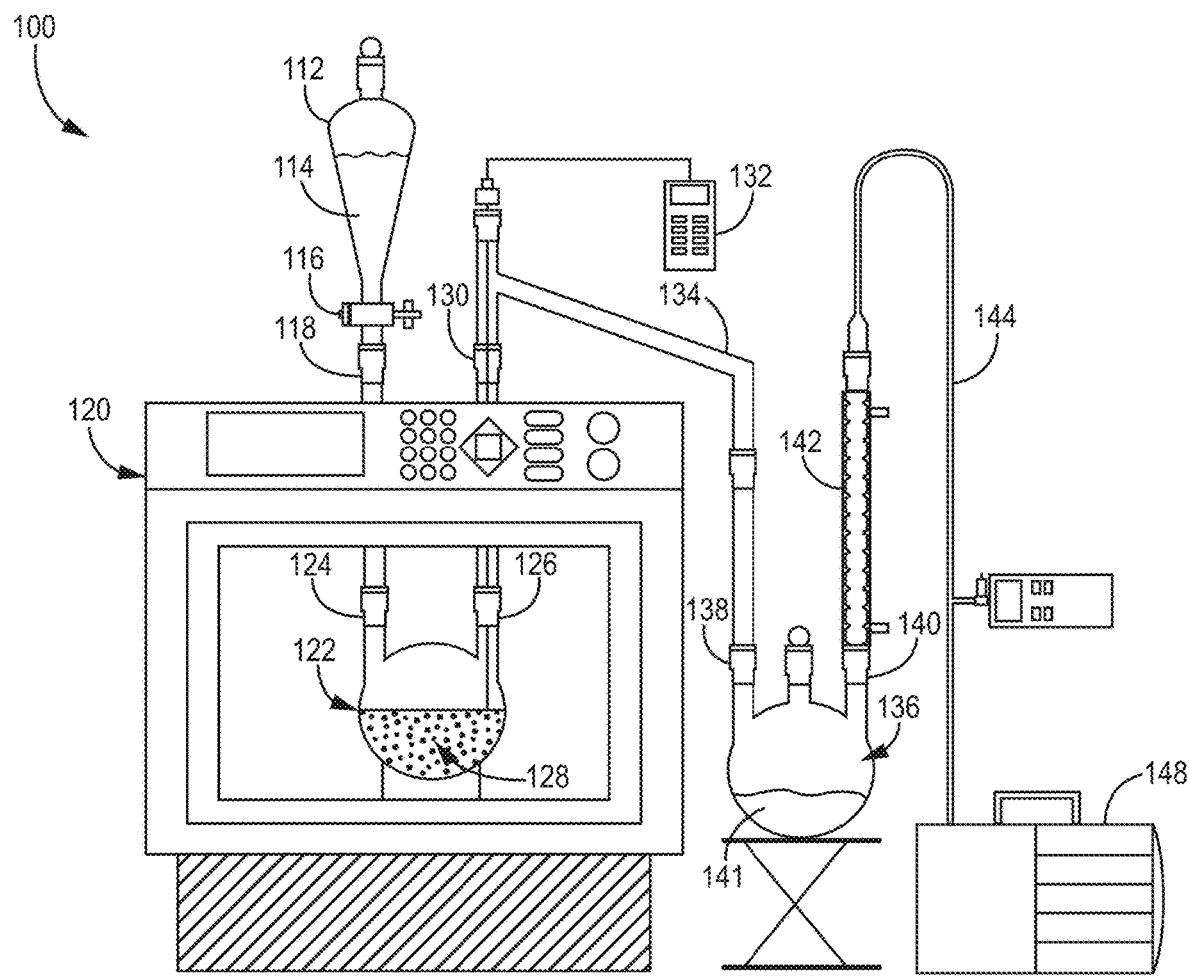
FIG. 1 illustrates a diagram of a microwave-assisted pyrolysis distillation system. according to some embodiments.

FIG. 1 is a diagram of a microwave-assisted pyrolysis (MAP) system utilized in distillation processes according to one embodiment. MAP system 100 includes feeder flask 112, valve 116, feeder adapter 118, microwave system 120, pyrolysis reactor 122 having input 124 and output 126, output adapter 130, thermocouple 132, bio-oil collection flask 136 having input 138 and output 140, chilled condenser 142, vacuum tube 144, manometer 146, and vacuum pump 148. In some embodiments, MAP system 100 is utilized in distillation processes (e.g., distillation of biodiesels), but in other embodiments may be utilized to recover usable products such as methyl esters from a waste stream such as vacuum distillation bottoms (VDBs). In general, the material to be distilled or the VDBs to be recovered are contained within feeder flask 112 are provided to microwave system 120, which includes a microwave-absorbent bed 128 susceptible to microwave irradiation to provide heating. For the sate of simplicity, the input to MAP system 100 will simply be referred to as the input stream. In one embodiment, wherein the liquid input stream is continuously added to a dry catalyst bed 128, wherein the liquid input stream undergoes flash pyrolysis (MAP) within the pyrolysis reactor 122, and wherein the volatile organic vapor resulting from the pyrolysis operation is provided to a condenser 142 to recover the desired product (e.g., bio-oil such as methyl ester). In other embodiments, a constant liquid level of the input stream is maintained within the pyrolysis reactor 122, and distillation pyrolysis (dMAP) is utilized within the pyrolysis reactor 122. Once again, the volatile organic vapor resulting from the pyrolysis operation provided to condenser 142 to recover the desired product (e.g., bio-oil such as methyl ester).

As described above, vacuum distillation of bio-diesels has grown from being relatively rare to a process that is now installed in more than 350 MMgy of U.S. plant capacities. The purified transparent methyl ester yield can range depending on the feedstock quality, but can be as high as 95% wt/wt the original material and routinely meets EPA quality testing. Benefits of utilizing the MAP system include faster heating rates of the input stream, reduced vapor loading, smaller footprint of the system, reduced liquid waste stream (e.g., VDBs), as well as cost savings.

In particular, the pressure of a gas is directly related to the volume of that gas at a given temperature. During traditional vacuum distillation of biodiesel for example, the expressed vapor volume of methyl esters is significantly greater than at atmospheric pressure, as in the case of pyrolysis. However during pyrolysis, to achieve the same expressed vapor load of methyl esters experienced during vacuum distillation, higher temperatures are required. For example, in some embodiments, pyrolysis utilizes temperatures greater than 230° C., and in some embodiments utilizes temperatures greater than 500° C., and in some embodiments utilizes temperatures greater than 550° C. Assuming a standard molecular weight (292 g/mole) and operation temperatures of 230° C. and 550° C., for traditional vacuum distillation and microwave-assisted vacuum distillation (pyrolysis) respectively, the vapor generated during pyrolysis is 1/208 the volume generated during traditional vacuum distillation. The reason for the volume reduction is the high vapor density of the microwave-assisted vacuum distillation (pyrolysis), which does not require the extremely low vacuum, vapor is at close to atmospheric pressure (0.2500 lbs/cubic ft), compared to traditional low pressure distillation (0.0012 lbs/cubic ft).

As a result, any MAP system designed to purify a large quantity of fluid (e.g., biodiesel) would be a fraction of the size of a traditional vacuum distillation system processing the same quantity. Not only smaller in size, but the cost associated with equipment and fabrication are also reduced. Without the need for a full vacuum rating on all tanks and pumps, the system becomes more simplistic in design and scope. Reducing the foot print of individual unit operations is important to production facilities and chemical processing plants.

In addition to the reduce footprint and reduced vacuum ratings required, another benefit of the disclosed invention is attributable to the fast heating rate achieved through the indirect heating of a microwave-absorbent bed 128. In some embodiments, the microwave-absorbent bed 128 is a silicon carbide (SiC) or Zirconium Dioxide ($ZrO_2$) In particular, the microwave-absorbent bed 128 acts to convert electrically generated microwaves into thermal energy quickly, allowing for the biomass/biodiesel, or methyl esters applied to the pyrolysis reactor 122 to be vaporized without thermally decomposing due to prolonged exposure to high temperatures. This faster heating rate—as compared with traditional heating methods—and higher overall obtainable temperatures allow for the exposure time between the liquid substrate and the catalyst bed 128 to be minimized to a few seconds or less (as compared with a few minutes in a traditional vacuum distillation system). In some embodiments, the microwave-absorbent particles making up microwave-absorbent bed 128 include a catalyst coating. In some embodiments, the inclusion of a catalyst coating increases the rate of the pyrolysis. In other embodiments, such as those shown in FIGS. 6-8b an additional catalyst bed—separate from the microwave-absorbent bed—is utilized to mix or coat the pyrolysis vapor to increase the content and/or selectively of the process. To reduce confusion, the particles utilized in the pyrolysis reactor to absorb microwave energy and referred to as a microwave-absorbent bed, despite the fact that they may additionally be coated with a catalyst material. Catalyst beds—described for example in FIGS. 6-8b—may likewise include microwave-absorbent material but act primarily as a catalyst and for that reason are referred to as catalyst beds.

In some embodiments, the microwave-absorbent bed 128 is comprised of silicon carbide beads. The size of the silicon carbide beads—or alternative microwave susceptible material—varies depending on the application from extremely small (e.g., powder form) to large (e.g., 50 centimeters(cm)). In some embodiments, the silicon carbide beads are approximately 1.0-2.0 cm in diameter. In addition, as discussed in more detail In some embodiments, the cost of utilizing electricity to generate the thermal energy required by the MAP system 100 is higher than the cost of utilizing other sources of energy such as natural gas. To mitigate the higher cost of electricity, in some embodiments a combination of electricity and alternative energy sources such as natural gas are utilized to provide the desired heating. For example, in one embodiment, an inexpensive heating source such as natural gas is utilized for bulk heating of the incoming fluid. For example, in one embodiment, natural gas is utilized to heat an oil, which in turn is utilized to provide thermal energy to the incoming fluid to be distilled. As discussed above, these oils can be efficiently used to transfer thermal energy between two liquids, but have upper temperature ranges of a few hundred degrees Celsius. Therefore, the microwave system 120 is utilized to provide additional heating above the upper limit of the heating oils. The combination of the two heating method provides a cost efficient way of obtaining the thermal energy required for MAP processing of the input stream. In addition, indirect heating of the microwave-absorbent bed 128 via microwave system 120 allows the temperature of the microwave-absorbent bed 128 and/or incoming fluid to be maintained at a desired temperature. That is, in embodiments using fMAP the temperature of the microwave-absorbent bed may be monitored and microwave energy controlled to maintain a desired temperature of the microwave-absorbent material. In embodiments using dMAP the temperature of the liquid within the pyrolysis reactor may be monitored and microwave energy controlled to maintain a desired temperature of the liquid.

The systems and methods described herein are generally applicable to processes for separating and/or recovering matter. Specific examples are discussed to illustrate the effectiveness of the systems and processes described herein. In some embodiments, MAP system 100 was utilized to recover over 97% wt/wt of the organic matter contained within non-distilled biodiesel. That is, over 97% of the organic matter contained within non-distilled biodiesel is vaporized and carried out of the reactor as a gas, leaving 3% wt/wt as a relatively inert residual material. As compared with traditional vacuum distillation, which results in residual distillation bottoms greater than >10% wt/wt, the MAP processing provides significant improvement in biodiesel distillation. In some embodiments, residual solids man accumulate within the pyrolysis reactor 122 and must be removed from the system using a separation technology. In one embodiment, slip-stream filtration is utilized. The vapors leaving the MAP system are then purified through fractional condensing, enriching the methyl esters and leaving the non-desirables in the gas phase, to be thermally oxidized and released to air. MAP processing of biodiesel for methyl ester purification for example would therefore reduce the total solid waste stream generated during traditional vacuum distillation.

In addition to a distillation process utilizing MAP. these techniques can be utilized in combination with traditional vacuum distillation techniques to recover methyl ester from the vacuum distillation bottoms (VDBs) generated as a waste-product in traditional vacuum distillation. The waste produced during biodiesel distillation, vacuum distillation bottoms (VDB), are dark in color with a higher viscosity, relative to biodiesel. VDBs can range in component type, but are primarily a mixture of C18 saturated and unsaturated methyl esters, dimerized and branched methyl esters, inorganic impurities, and unreacted acyl-glycerides left over from transesterification. In the embodiment shown in FIG. 1, VDBs 114 collected from a transesterification process are collected in feeder flask 112, and selectively provided to microwave system 120 via valve 116 (e.g., needle valve) that controls the rate at which VDBs are provided to microwave system 120.

In one embodiment, microwave system 120 is configured to receive feeder adapter 118 and output adapter 130 (e.g., glass adapters). In one embodiment, microwave system 120 is a modified CEM Corporation MARS 6 microwave digestion system equipped with a 1000-Watt primary magnetron and an 800 Watt secondary magnetron, providing a total of 1.8 kW of available input energy. The feeder adapter 18 and output adapter 130 allows for the continuous feeding and removal of organic material during operation.

In one embodiment, liquid VDBs are heated (e.g., 120° C.) and mixed in feeder flask 112. Because VDBs are a low-oxygen containing liquid oil, they can be heated prior to entering the pyrolysis reactor 122 without unwanted oxidation. VDBs are then drawn into pyrolysis reactor 122 via feeder adaptor 118 at a rate determined by valve 116. In one embodiment, vacuum pump 148 maintains a vacuum in pyrolysis reactor 122 (e.g., 80 kPa), wherein manometer 146 monitors and provides feedback to vacuum pump 148 to maintain a desired pressure. In one embodiment, maintaining a slight vacuum (negative pressure) inside the MAP system 100 acts to avoid any positive pressure inside pyrolysis reactor 122 during liquid vaporization. In addition, maintaining a slight vacuum (negative pressure) inside the MAP system 100 acts to reduce the vaporization temperature of the methyl esters. In one embodiment, atmospheric pressure is assumed to be approximately 760 mmHg, wherein pressure maintained by the vacuum pump 148 is less than atmosphere pressure (e.g., less than 760 mmHg). In one embodiment, a pressure of approximately 80 kPa (600 mmHg) was selected, which provides a low risk of leaking air into the system, and allows organic volatiles to condense at a temperature of approximately 32° C. while maintaining a vapor velocity equal to the evolution of volatiles from the liquid biomass. In some embodiments, vacuum pump 148 maintains a pressure less than 600 mmHg. Typical distillation of biodiesels utilizes a vacuum of approximately 2-4 mmHg. In some embodiments, vacuum pump 148 maintains a pressure greater than 4 mmHg.

Pyrolysis reactor 122 further includes a microwave-absorbent bed 128 to absorb irradiation of microwave energy. In general, VDBs do not have the dielectric properties required to efficiently absorb microwave radiation directly. In other embodiments, other methods of transferring heat to the VDBs may be utilized, such as traditional thermal oil heating systems. However, microwave systems with a properly selected irradiation absorption catalyst allows for heating to temperatures greater than 1000° C. In one embodiment catalyst bed 128 is comprised of silicon carbide (SiC), which in addition to susceptor attributes provides a positive catalytic effect on the bio-oil component selectivity. For example, microwave-absorbent bed 128 may be comprised of a plurality of SiC beads having a defined particle diameter (e.g., 1.8 cm). The microwave-absorbent bed (e.g., SiC) acts as a susceptor to microwave irradiation provided by microwave system 120. In one embodiment, the volume or weight of the microwave-absorbent bed is maintained at a substantially constant value (e.g., 500 g) throughout the process, resulting in a substantially constant absorption potential, and therefore substantially constant heating rate. As described in more detail with respect to FIGS. 2a and 2b, flash microwave-assisted pyrolysis (fMAP) or distillation microwave-assisted pyrolysis (dMAP) may be utilized by the microwave system 120. In fMAP, a continuous feed of liquid VDBs are provided onto the dry microwave-absorbent bed 128 for "flash" pyrolysis. In this embodiment, the volatile oils are flashed from the surface of the microwave-absorbent bed 128. In some embodiments, during fMAP the temperature of the microwave-absorbent bed 128 is monitored and controlled to a desired temperature through increase/decrease of microwave energy supplied to the microwave-absorbent bed 128. In contrast, in dMAP, a liquid level of VDBs is continuously maintained within the pyrolysis reactor 122, allowing for flashing of the volatile oil from the liquid surface. In some embodiments, during dMAP the temperature of the liquid is monitored and controlled to a desired temperature through increase/decrease of microwave energy supplied to the microwave-absorbent bed 128.

Off-gases and volatile organics generated from the MAP of VDBs exit pyrolysis reactor 122 via output adapter 130 and are provided to chilled condenser 142 (e.g., approximately 18° C.), which causes volatile organics to condense and collect in bio-oil collection flask 136 located below the chilled condenser 142. Off-gases, composed of hydrogen ($H_2$), carbon monoxide (CO), carbon dioxide ($CO_2$), and non-condensable gases, passed through the condenser and out of the system via tube 144 and vacuum pump 148.

FIGS. 2a and 2b is a simple diagram of flash microwave-assisted pyrolysis (fMAP) and distillation microwave-assisted pyrolysis (dMAP), respectively, according to embodiments of the present disclosure. In the embodiment shown in FIG. 2a, an inlet header 202 provides liquid VDBs (i.e., distillation bottoms) to pyrolysis reactor 203. In the embodiment shown in FIG. 2a, the liquid VDBs are provided to silicon carbide bed 206. As a result of the fMAP of the VDBs, a bio-oil vapor is expelled through the top of the pyrolysis reactor 203, to be condensed as discussed with respect to FIG. 1. In addition, residual solids are creates as a result of the pyrolysis operation, and can be filtered by filter 210. In one embodiment, the SiC particles can be continuously mixed, allowing the residual solids to filter through the ceramic medium, collecting at the bottom of pyrolysis reactor 203, wherein the residual solids are collected by slip-stream 208 and filtered by filter 210.

In the embodiment shown in FIG. 2b, an inlet header 224 provides liquid VDBs (i.e., distillation bottoms) to pyrolysis reactor 223. However, in this embodiment, the liquid VDBS are provided such that a constant level of liquid VDBs are maintained within the pyrolysis reactor 203. Depending on the rate of pyrolysis, the flow of VDBs into the pyrolysis reactor 203 may have to be increased or decreased to maintain a constant fluid level. In the embodiment shown in FIG. 2b, the liquid VDBs completely cover the SiC bed 226. As a result of the dMAP of the VDBs, a bio-oil vapor 232 is expelled through the top of the pyrolysis reactor 223, to be condensed as discussed with respect to FIG. 1. In one embodiment, a continuous solids filtration system comprised of slip stream 228 and filter 230 could circulate from the maintained liquid-level of VDBs inside the reactor, back to the incoming VDB stream entering the reactor.

An important aspect of both fMAP and dMAP is the rate at which the VDBs are added to pyrolysis reactor 122 (shown in FIG. 1). For example, in the dMAP embodiment, it is important to maintain a liquid-level of VDBs just above the microwave-absorbent bed 226 as shown in FIG. 2b. To achieve this, fine control of the needle valve inlet separating the feeding flask 112 from the pyrolysis reactor 122 (as shown in FIG. 1) is required. Because the reactor is sealed and no visual assessment could be made during the reaction, the rate of the bio-oil collection (e.g., methyl ester collection) was used to control the VDBs feed rate. In one embodiment, to achieve the steady-state feed rate required to maintain a constant liquid-level, the rate of bio-oil collection must be equal to the initial rate of feeding, multiplied by the percent of bio-oil that is potentially condensable in the VDBs. To make this determination, experimental mass balance trials were conducted using a fixed amount of VDBs. The VDBs were heated, vaporized, and then condensed outside of the reactor in order to establish the average weights of products; bio-oil, residual solids, and off-gas (measured by difference). The amount of bio-oil expected from the VDBs was approx. 85.9% (wt/wt), resulting in a ratio of 1.16:1, VDBs fed to bio-oil collected. This figure was used to determine both the expected bio-oil collection rate, and by extension, the required rate of VDBs fed to the reactor to maintain a steady-state.

As measuring the rate of collection by mass was not an option due to the fixed-nature of the system, collection by volume was accomplished by graduating the receiver/collection flask 136 (shown in FIG. 1). By timing the reaction with a stop-watch, the rate of collection was calculated in real-time and the feed rate was adjusted accordingly in order to maintain a continuous liquid level during distillation-pyrolysis.

After establishing the correct rate ratio, an experimental feed rate may be selected. The feed rate is limited as a function of both the overall power to biomass input as well as the exposed surface area of VDBs, above the SiC. In one embodiment, a relatively slow flow-rate of approximately 4.0 g/min was chosen as the amount of energy required to vaporize the flow and was determined small relative to the energy used to maintain the system at approximately 550° C., guaranteeing vaporization was not limited as a function of residence time. In other embodiments, as the temperature is increased, the flow-rate may be increased to accommodate a faster pyrolysis rate.

Similarly, for fMAP operations it is important to control the flow of VDBs into the pyrolysis reactor 202 in order to avoid any build-up or pooling of VDBs. In one embodiment, to standardize the exposure time or hydraulic retention time of the VDBs in the reactor the desired flow rate was based on the results of the distillation-pyrolysis rate determination experiments, which as discussed above was selected to be approximately 4.0 g/min. As the figure was calculated to maintain a continuous liquid level, in theory there should be no build-up of material during flash pyrolysis. As the VDBs entered the pyrolysis reactor 203 at 4.0 g/min, the volatile components of the material (85.9% wt/wt) were vaporized and sent out of the condenser (not shown) to be condensed, while the inert residual solids remained in the reactor. One assumption made during flash-pyrolysis was that the build-up of the non-vaporized material did not affect the microwave absorption efficiency or catalytic potential of the SiC. The inclusion of slip-stream 208 and filter 210 aids in this assumption, by removing the build-up of non-vaporized material. Unlike distillation-pyrolysis, where the SiC bed 226 is strictly a susceptor for heat generation, fMAP involves significant catalytic activity due to the much higher catalyst to VDBs ratio. Significant build-up of inert, non-volatile material on the microwave-absorbent bed could potentially cause a drop in catalytic activity due to lowered surface area. However, at the average weight concentration of less than 5%, the build-up of residual solids was determined negligible to absorption efficiency and catalytic activity.

In one embodiment, flash-pyrolysis testing was limited to 30-40 minutes due to potential solids build-up. During pilot or commercial scale operations the residual solids could theoretically be continuously removed from the system as illustrated by slip-stream 208 and filter 210.

Figure 3:
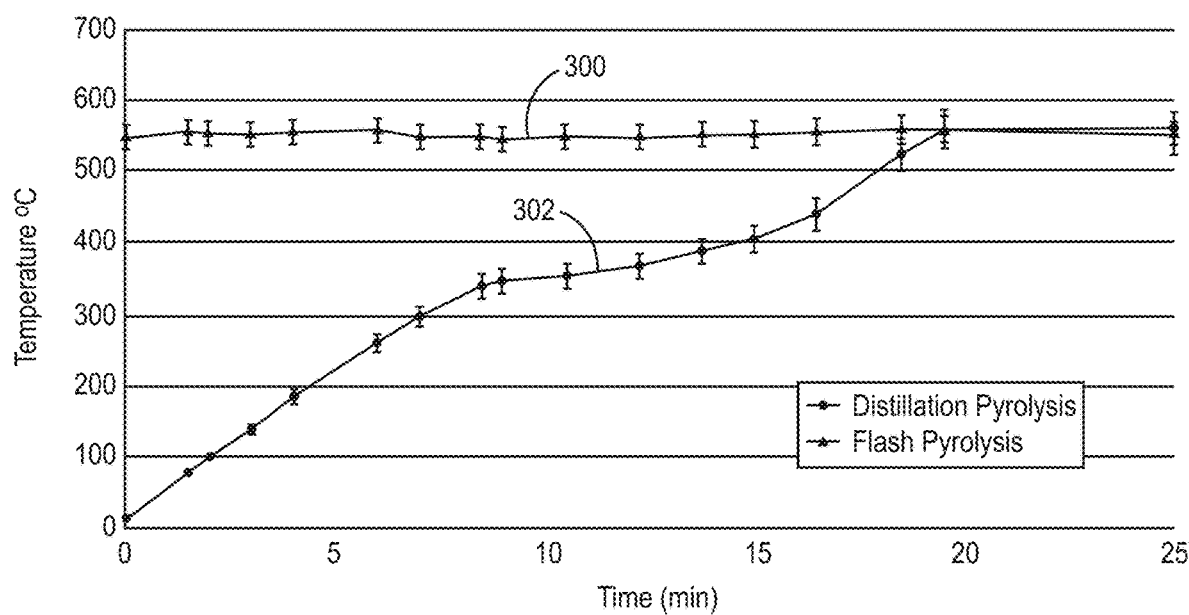
FIG. 3 illustrates a graph of the heating rate analysis for continuous liquid-level pyrolysis of vacuum distillation bottoms (VDBs), according to some embodiments.

FIG. 3 is a graph illustrating the heating rate analysis for Continuous liquid-level pyrolysis of vacuum distillation bottoms (VDBs), wherein line 300 illustrates heating rate analysis for fMAP and line 302 illustrates heating rate analysis for dMAP according to some embodiments. In one embodiment, the heating rate of the VDBs and SiC catalyst was calculated experimentally to establish upper and lower vaporization temperatures. A measure of the hold temperature was also performed on the SiC catalyst without any substrate added. This was used to access the average deviation in temperature control during steady-state heating. The results provided in FIG. 2 shows the temperature versus time for both pyrolysis reaction scenarios (e.g., fMAP and dMAP, illustrated by lines 300 and 302, respectively), and in particular illustrates the heating rate and fluctuation of the reactor temperature during microwave heating. Distillation pyrolysis heating utilized in dMAP, wherein the VDBs are pre-loaded onto the SiC catalyst bed, yielded a heat rate of 38° C./min, from 21° C. to 350° C. As the VDBs reached 350° C., they vaporized and migrated up the column. As the transfer from simple to latent heating continued, less of heat input remained contained within the reactor, lowering the perceived heating rate of the reactor mixture. The vaporization transition can be seen in FIG. 2 by line 302 as the temperature increase slowed down and became non-linear. As the organic fraction was removed from the system, the heating rate slowly increased, until a final temperature of 550° C. was reached. This was considered the endpoint for any vaporization potential as it represented the linearly predicted temperature outcome of the initial heating rate of 38° C./min, at that time (min). Therefore, the vaporization range of the VDBs was between 350° C. and 550° C. To guarantee complete vaporization while maintaining energy efficiency, the upper boundary temperature of 550° C. was chosen as the fixed reaction temperature for both sets of reaction conditions; distillation and flash pyrolysis. To determine the temperature control of the system, the reactor was heated to the desired temperature and maintained for 25 minutes. The results were plotted in FIG. 2 by line 300 and yielded an average temperature of $552\pm4°$ C.

Figure 4:
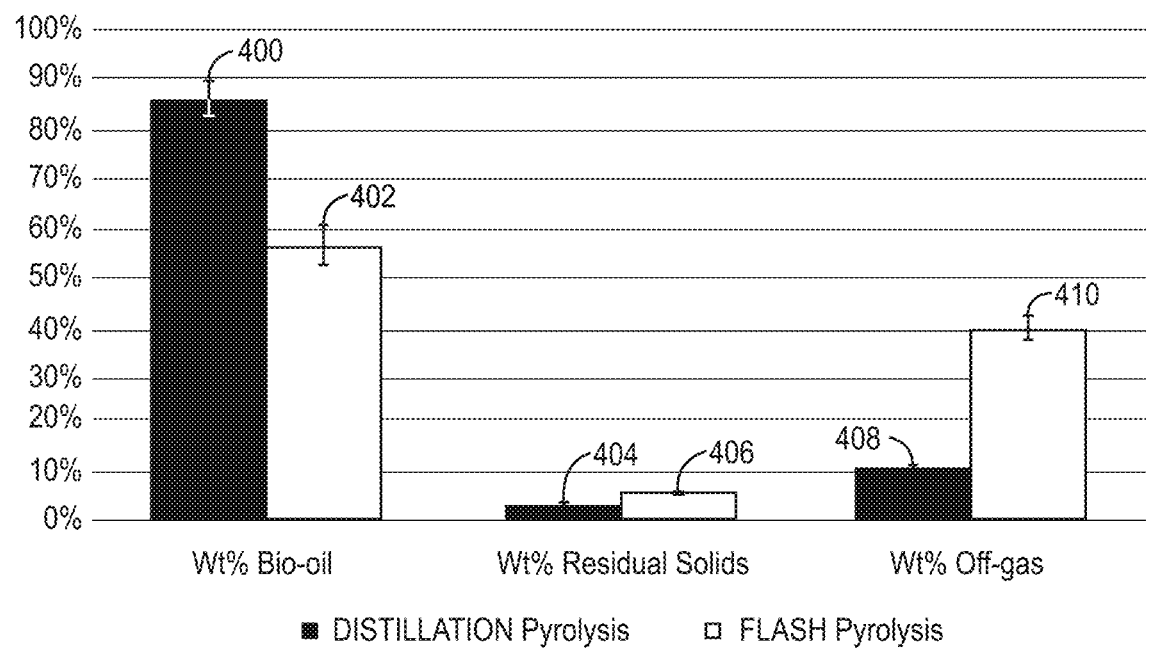
FIG. 4 illustrates a bar chart of the mass composition of microwave pyrolysis by-products, bio-oil, residual solid, and off—gas for both distillation and flash pyrolysis, according to some embodiments.

FIG. 4 is a bar chart illustrating experimental results regarding the mass composition of microwave pyrolysis by-products, bio-oil, residual solid, and off—gas for both distillation and flash pyrolysis. Bars 400 and 402 illustrate mass composition of bio-oils (e.g., methyl esters) recovered utilizing dMAP and fMAP methods, respectively. Bars 404 and 406 illustrate mass composition of residual solids recovered utilizing dMAP and fMAP methods, respectively. Bars 408 and 410 illustrate mass composition of off-gases recovered utilizing dMAP and fMAP methods, respectively.

According to the results, the dMAP process resulted in reclaiming of $85.9\pm2.3\%$ of the initial $47.5\pm8.7$ grams of VDBs as a transparent bio-oil, as illustrated by bar 400. In contrast, fMAP recovered approximately $55.6\pm4.8\%$ of the initial $53.8\pm5.7$ grams of VDBs as bio-oil, as illustrated by bar 402. The residual solids for dMAP and fMAP were relatively similar, at $3.2\pm0.07\%$ and $5.6\pm0.05\%$ respectively. As the initial substrate for each reaction scenario was the same, the inert content should be constant. A plausible explanation for the minor rise in residual material during fMAP is the formation of tars and other stable oxygenated oil derivatives caused during the flashing of the material against the catalyst surface. The removal of residual solids from the reactor was not considered during the experiment; however, the rate at which residual solids were created is vital for the eventual development of a continuous process. Averaging the final residual solids over the total reaction time yielded a solids rate formation of $0.036\pm0.004$ g/min for distillation pyrolysis and $0.075\pm0.011$ g/min for flash pyrolysis. The amount of off-gas produced during fMAP was the highest at $38.9\pm1.72\%$, while dMAP only produced $10.9\pm2.5\%$ wt/wt off-gas during the reaction time.

Figure 5A:
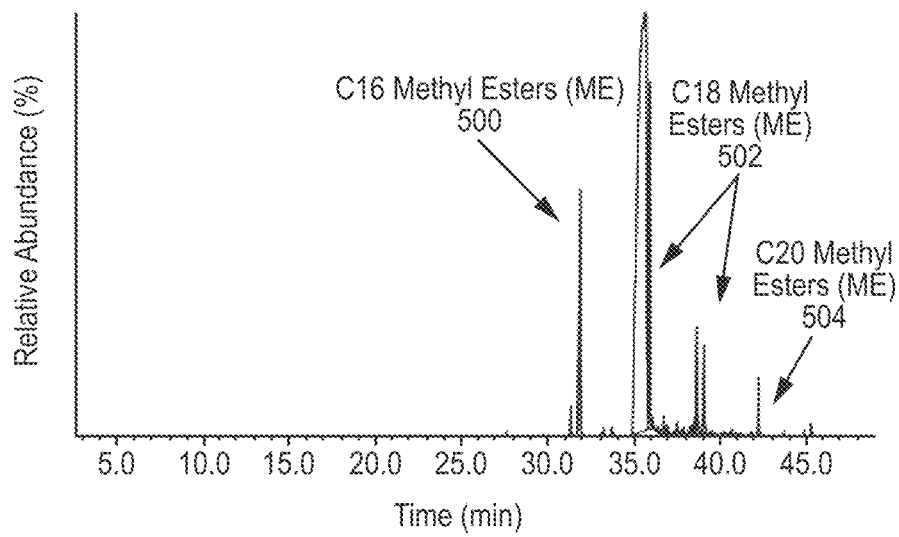
FIG. 5A illustrates the percentage relative abundance of distillation bottoms, according to some embodiments.
Figure 5B:
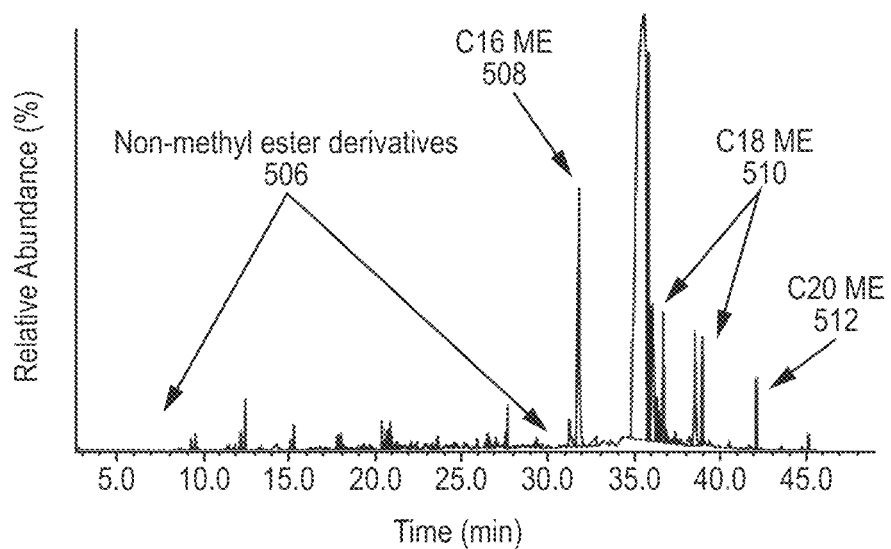
FIG. 5B illustrates the percentage relative abundance of bio-oils reclaimed as a result of dMAP, according to some embodiments.
Figure 5C:
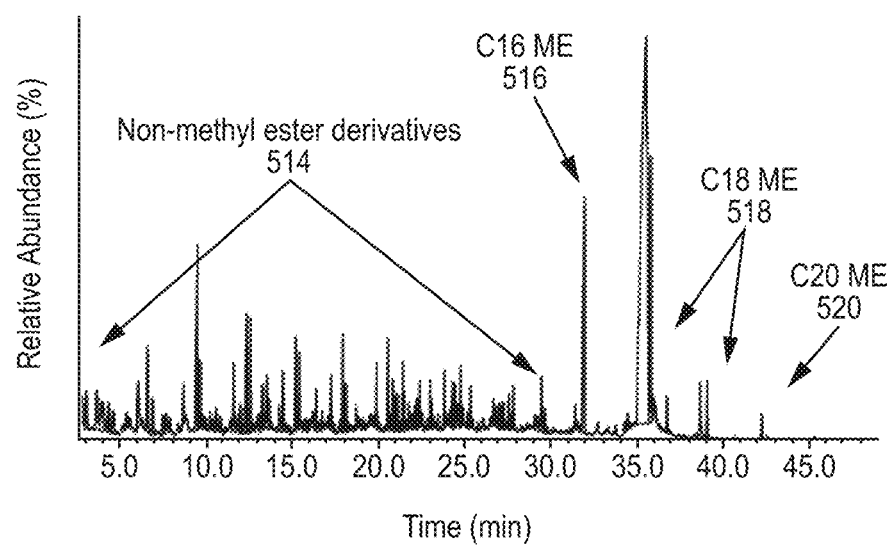
FIG. 5C illustrates the percentage relative abundance of bio-oils reclaimed as a result of fMAP, according to some embodiments.

FIGS. 5A-5C are graphs illustrating the percentage relative abundance of VDBs, bio-oils reclaimed as a result of dMAP, and bio-oils reclaimed as a result of fMAP. respectively.

The chromatogram on top represents the VDBs, showing the majority of the detected compounds were methyl esters (e.g., C16 methyl esters 500, C18 methyl esters 502, and C20 methyl esters 504), with only trace amounts of other detectable compounds. The middle chromatogram represents bio-oil derived from dMAP processing, and shows the appearance of smaller molecular weight, non-methyl ester derivative compounds 506, along with methyl esters C16, C18 and C20 (labeled 508, 510, and 512, respectively). The bottom chromatogram shows the fMAP derived bio-oil. In this embodiment, the relative abundance of non-methyl ester derivatives 514 in the fMAP chromatogram is greater than that detected in the dMAP chromatograph. As a result of derivative species formation, the relative abundance of methyl esters in the fMAP bio-oil decreased, lowering the overall methyl ester content (e.g., C16, C18 and C20 methyl esters labeled 516, 518, and 520 respectively) of the bio-oil as compared with the bio-oils derived from dMAP processing.

Table 1, shown below, illustrates the composition of VDBs, bio-oils derived from the dMAP process, and bio-oils derived from the fMAP process.

TABLE 1

| Substrate and Bio-Oil Component Profiles | Relative Freq (%) | Carbon/Mole Ratio | Average M.W. |
|---|---|---|---|
| Distillation Bottoms | | | |
| Methyl Ester = | 84.05% | 18.0 | 296 |
| Monoglyceride = | 5.40% | 18.0 | 350 |
| Diglyceride = | 4.20% | 39.0 | 610 |
| Triglyceride = | 0.51% | 57.0 | 860 |
| Free Fatty Acid = | 5.81% | 18.0 | 271 |
| Free Glycerin = | 0.03% | 3.0 | 32 |
| Bio-Oil - Distillation Pyrolysis | | | |
| Methyl Esters = | 90.34 ± 4.02% | 17.4 ± 0.4 | 287 ± 6 |
| Dimerized Methyl Esters = | 1.19 ± 0.76% | 10.1 ± 0.3 | 220 ± 5 |
| Branched Methyl Esters = | 3.94 ± 4.35% | 15 ± 8.7 | 256 ± 149 |
| Aldehydes = | 0.88 ± 1.52% | 6 ± 10.4 | 264 ± 153 |
| Free Fatty Acids = | 1.53 ± 0.91% | 14.8 ± 8.6 | 239 ± 139 |
| Hydrocarbons = | 3.31 ± 2.02% | 14.2 ± 0.3 | 199 ± 3 |
| Cyclic-Hydrocarbons = | 0.31 ± 0.18% | 8.8 ± 5.1 | 155 ± 95 |
| Oxy-Cyclic-Hydrocarbons = | 0.64 ± 0.47% | 13 ± 8.5 | 193 ± 111 |
| Bio-Oil - Flash Pyrolysis | | | |
| Methyl Esters = | 73.97 ± 1.37% | 15.3 ± 0.3 | 257 ± 3 |
| Dimerized Methyl Esters = | 0.51 ± 0.36% | 10.0 ± 7.1 | 136 ± 96 |
| Branched Methyl Esters = | 0.00% | 0.0 | 0 |
| Aldehydes = | 0.00% | 0.0 | 0 |
| Free Fatty Acids = | 0.00% | 0.0 | 0 |
| Hydrocarbons = | 20.09 ± 5.27% | 10.9 ± 0.3 | 157 ± 5 |
| Cyclic-Hydrocarbons = | 3.79 ± 3.93% | 11.2 ± 1.7 | 149 ± 15 |
| Oxy-Cyclic-Hydrocarbons = | 1.89 ± 0.33% | 10.5 ± 0.3 | 154 ± 6 |

* Distillation bottoms were averaged from 3 separate tests of the same substrate. The bio-oil products were average from 3 separate samples, generated from identical reaction conditions.

As shown in Table 1, the newly formed compounds were a mixture of hydrocarbons, oxygen containing derivatives, and branched and dimerized methyl esters. The derivatives species were categorized into several groups, based on the compound type; methyl ester, dimerized methyl ester, branched methyl ester, aldehyde, free fatty acid, hydrocarbon, oxygenated hydrocarbon (ether), and cyclic oxygenated hydrocarbon. The relative frequencies of the different derivative compounds in each bio-oil are also listed in Table 1, along with the relative frequencies of the compounds in the initial VDBs. In addition, the average carbon per mole, and the molecular weight was reported as a method to gauge average chain length of the derivative.

As the formation of these derivatives compounds is not reported during commercial biodiesel production, they were thought to be a result of a several altered reaction conditions i.e. flashing evaporating in the presence of a catalyst, increased temperature, and increased pressure. Based on the results of gas chromatography—mass spectrometry (GC-MS), the presence of surface flashing from the catalytic surface was the major contributor in the formation of derivatives species. This was illustrated in a comparison of FIGS. 5*b* and 5*c*, which illustrates far fewer derivate species (e.g., non-methyl ester derivatives) formation as a result of dMAP processing as compared to fMAP processing. As the mechanism for vaporization of the VDBs in the fMAP process versus the dMAP process (e.g., surface flashing versus liquid-surface distillation) was the most significant difference between the two processes, it is theorized that the mechanism for vaporization is the cause of the difference in the measured derivative species. However, it should be noted that other factors may have contributed to the differences in the measured species. For example, while traditional biodiesel distillation is performed at lower temperatures and pressures (~200° C. and 0.26 kPa), MAP vaporization (both fMAP and dMAP) occurs at a significantly higher temperature and pressure (550° C. and 101 kPa). The extreme conditions of MAP vaporization, relative to traditional biodiesel distillation, could contribute to the greater thermal decomposition seen during MAP processing.

In particular, Table 1 shows that bio-oil from dMAP contained 16.4% wt/wt more methyl esters than fMAP. Alternatively, fMAP bio-oil contained 16.8% wt/wt more hydrocarbon content than dMAP, as a result of the methyl ester reformation. In addition to increased hydrocarbon content after fMAP processing, there was also an increase in oxygenated-hydrocarbons and cyclic, oxygenated-hydrocarbons. Alternatively, dMAP processing showed an increase in methyl ester derivatives, dimerized and branched, relative to fMAP. These dimerized and branched methyl esters can have improved characteristics, such as greater lubricity and depressed cloud points, relative to their analogous straight-chain methyl esters.

Analysis of the average carbon content per mole of each species was performed on the bio-oils, and reported in Table 1 in the second column. As expected, the initial VDBs contained the highest average carbon content per mole, with methyl esters at C:18. The resulting bio-oils averaged lower carbon per mole ratios, with their methyl esters averaging C:17.0±0.4 for dMAP and C:15.3±0.3 for fMAP. As the carbon content per mole was reduced, the average molecular weight of each species dropped, as shown in Table 1.

In one embodiment, the MAP processing described herein is utilized in applications associated with bio-diesel processing and in particular in subsequent processing of VDBs resulting as a waste product associated with distillation of bio-diesels. The of the subsequent MAP processing is to determine whether the bio-oils (e.g., methyl esters) recovered from MAP processing could be utilized as a secondary methyl ester rectification process, either inserted immediately following the initial biodiesel distillation or as a separate process. Both the dMAP and fMAP systems were designed to mimic two different continuous processes, each producing a distinct bio-oil with varying concentrations of methyl esters and unique derivatives. As a methyl ester reclamation technology, the desired product of each system would be a liquid fuel that closely resembled B100 biodiesel. In one embodiment, the bio-oil produced from the MAP processing is utilized in a B20 blend in petroleum diesel. In another embodiment, the bio-oil produced from the MAP processing is utilized as a B100 blend with previously distilled biodiesel. As a B20 petroleum blend, the MAP bio-oil represents a B100 replacement, in which a MAP system could operate independently of a biodiesel production facility. As a B100 blend, the MAP system could operate in series with any commercial biodiesel facility utilizing vacuum distillation, blending the resulting bio-oil back into the initially distilled B100.

In one embodiment, critical tests from ASTM D7467-Standard Specification for Diesel Fuel Oil, Biodiesel Blend and ASTM D6751 Standard Specification for Biodiesel Fuel Blend Stock (B100) for Middle Distillate Fuels were chosen to test the product quality and repeatability of the process. Results are provided in Table 2, reproduced below, which illustrates the results associated with both the dMAP and fMAP processes.

TABLE 2

| Analytical Test | ASTM Method | Report Criteria | Dist. Pyrolysis | Flash Pyrolysis |
|---|---|---|---|---|
| A) 20% wt/wt Bio-Oil in Petroleum Diesel | | | | |
| Ash Content | D482 | 0.01% max | <0.005 | <0.005 |
| Biodiesel Content | D7371 | % (v/v) | 21.72 ± 2.48 | 22.47 ± 0.77 |
| Cloud Point | D2500 | n/a | <−15° C. | <−15° C. |
| Copper Strip Corrosion | D130 | No. 3 max | 1a | 1a |
| Oxidation Stability | EN 15751 | 6 min | 13.6 ± 1.20 | 12.90 ± 2.70 |
| Micro-Carbon Residue | D4530 | 0.35% max | 0.04 ± 0.01 | 0.02 ± 0.02 |
| Sulfur by UVF | D5453 | 500 ppm (wt/wt) | 96.80 ± 4.50 | 97.35 ± 2.15 |
| Kinematic Viscosity | D445 | 1.9-4.1 mm$^2$/s | 2.95 ± 0.08 | 2.56 ± 0.12 |
| Acid Number | D664 | 0.3 mg KOH/g | 2.58 ± 0.80 | 3.34 ± 0.27 |
| Water Content (KF) | D6304-16e1 | 0.05% vol. | <0.0015 | <0.0015 |
| B) 10% wt/wt Bio-Oil in Distilled B100 Biodiesel | | | | |
| Ash Content | D482 | 0.01% max | <0.005 | <0.005 |
| Cloud Point | D2500 | n/a | 12.9 ± 0.8° C. | 12.1 ± 0.6° C. |
| Copper Strip Corrosion | D130 | No. 3 max | 1a | 1a |
| Oxidation Stability | EN 15751 | 6 min | 7.93 ± 0.76 | 7.86 ± 0.59 |
| Micro-Carbon Residue | D4530 | 0.35% max | 0.004 ± 0.001 | 0.002 ± 0.001 |
| Sulfur by UVF | D5453 | 500 ppm (wt/wt) | 23.18 ± 1.83 | 23.23 ± 1.54 |
| Kinematic Viscosity | D445-40 | 1.9-6.0 mm$^2$/s | 4.07 ± 0.11 | 4.03 ± 0.09 |
| Acid Number | D664 | 0.5 mg KOH/g | 0.49 ± 0.16 | 0.57 ± 0.19 |
| Water Content (KF) | D6304-16e1 | 0.05% vol. | <0.0015 | <0.0015 |

*Analytical results in section A) were performed and reported according to ASTM D7467, while results for section B) were reported according to ASTM D6751.

Table 2, Section A illustrates the results of the B20 blend with petroleum diesel, with the blended fuel from both systems passing all test criteria, except for the Acid Number (AN). For dMAP and fMAP, the AN was 8.6× and 11.1× times the ASTM reporting criteria of 0.3 mg KOH/g. The high acid value of the bio-oil indicates further process is required before the bio-oil from either process, fMAP and dMAP, could be used as a direct replacement for B100 in a B20 petroleum blend. Table 2, section B shows the results of MAP bio-oil blended into distilled B100 biodiesel. Assuming an initial distillation efficiency of 90% wt/wt, leaves 10% wt/wt in the form of VDBs. According to lab results, a bio-oil recovery efficiency of 85% wt/wt, relative to the weight of the initial VDBs, was used to calculate the blend ratios of the B100 and bio-oil. Once blended, the mixture was sent to a third-party laboratory for B100 certification. According to the results, the dMAP derived bio-oil and B100 blend passed all the ASTM D6751 test criteria, while the fMAP derived bio-oil blend was marginally over the AN upper reporting limit of 0.5 mg KPH/g, at 0.57 mg KPH/g. Further processing using ion-exchange columns could reduce the AN to below reporting criteria.

Figure 6:
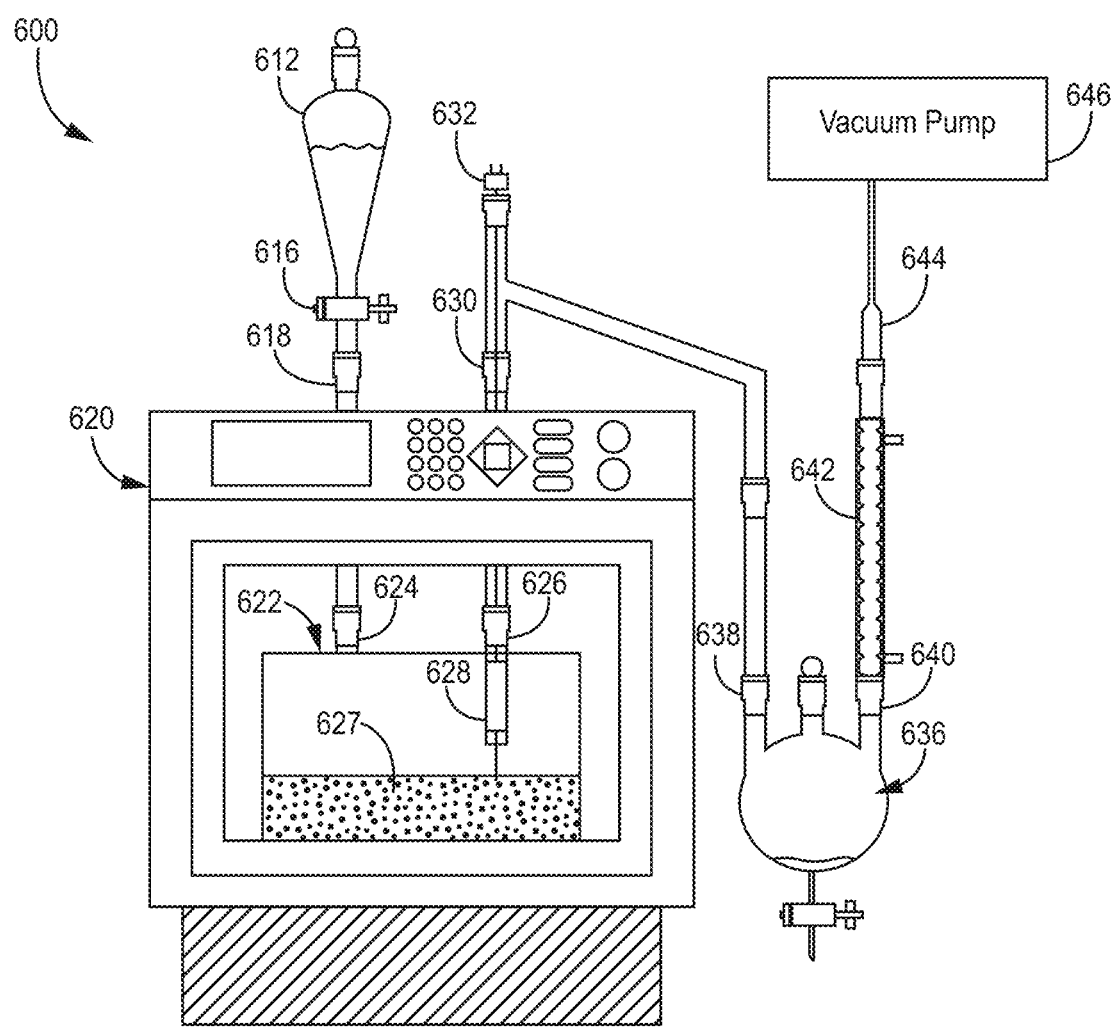
FIG. 6 illustrates a diagram of a microwave-assisted pyrolysis distillation system, according to some embodiments.

FIG. 6 is a diagram of a microwave-assisted pyrolysis (MAP) system utilized according to one embodiment. MAP system 600 includes feeder flask 612, valve 616, feeder adapter 618, microwave system 620, pyrolysis reactor 622 output adapter 630, thermocouple connector 632, bio oil collection flask 636 having input 638 and output 640, chilled condenser 642, vacuum tube 644, and vacuum pump 646. In some embodiments, pyrolysis reactor 622 comprises input 624, output 626, microwave absorbent bed 627, and catalyst bed 628. As compared with the embodiment shown in FIG. 1, the embodiment shown in FIG. 6 includes a catalyst bed 628 located within the pyrolysis reactor 622. The purpose of the catalyst bed 628 is to mix and/or coat the molecules associated with the pyrolysis gas to increase the relative content of the distillate. In the embodiment shown in FIG. 6, the catalysts bed 628 may include a porous material (not shown) utilized to retain the catalyst bed 628 within the output adapter 630. For example, in some embodiments the porous material utilized to retain the catalyst bed 628 is a silica wool that allows the pyrolysis gas to pass through to the catalyst bed 628.

As described with respect to the embodiment shown in FIG. 1, the feed is provided via valve 616 and feeder adapter 618 to the pyrolysis reactor 622 located within the microwave system 620. Microwave-absorbent bed 627 converts microwave energy to heat that is efficiently transferred to the feed. In one embodiment, the pyrolysis reactor 622 is a downdraft reactor generates a pyrolysis gas that is provided to catalyst bed 628. As described above, the catalyst bed 628 includes a catalyst that is utilized to coat and/or mix with the pyrolysis gas. After passing through the catalyst bed 628, the mixed and/or coated pyrolysis gas is provided via output adapter 630 to bio-oil collection flask 636, which in conjunction with chilled condense 642 collects the hydrocarbon fuel. Vacuum pump 646 once again acts to create a slight vacuum within the MAP system 600.

The MAP system 600 may be utilized in a number of applications. For example, in one embodiment the MAP system 600 is utilized to produce a hydrocarbon fuel from a soapstock feed. In some embodiments, a soapstock is defined as a concentrated solution of salts of fatty acids obtained in the refining of edible oils. The soapstock is stored in feeder flask 612 and supplied to the microwave system 620 via valve 616 and feeder adapter 618. The microwave-absorbent bed 627 is comprised of a plurality of microwave absorbent particles such as Silicon Carbide (SiC) or Zirconium Dioxide ($ZrO_2$). As described above, the size of the absorbent particles may be selected based on the application but may vary from a powder to centimeter scale. Likewise, the temperature of the microwave-absorbent bed 627 may be selected based on the application and may vary from 200° to over 1000°. In one embodiment, hydrocarbon fuel production from soapstock utilizes a temperature of between 500° C. and 600° C. Utilizing a temperature of approximately 550° C. provided a yield of hydrocarbon fuel of approximately 65% without use of the catalyst bed 628.

The yield of hydrocarbon fuel is increased to approximately by providing the pyrolysis gas through the catalyst bed 628. For example, in one embodiment a catalyst bed comprised of HZSM-5 catalyst increases the relative content of hydrocarbons and further increases the selectively of aromatics. In other embodiments, other catalysts may be utilized to modify the relative content of hydrocarbons and/or the selectively of the aromatics. The relative content of hydrocarbons is also dependent, at least in part, on the ratio of catalyst to feedstock. For example, increasing the catalyst to feed ratio increases the relative content of hydrocarbons. In one embodiment, utilizing the catalyst bed 628 with a selected catalyst to feed ratio provided a relative content of hydrocarbons of approximately 88% and a selectivity of aromatics of approximately 30%. For example, in one embodiment the feedstock to catalyst ratio is approximately 2:1 (although described as catalyst to feedstock ratio above, here the ratio is defined in terms of feedstock to catalyst). In addition, the bio-char byproduct produced as a result of the pyrolysis of soapstock to hydrocarbon fuel has a micropore structure and high contents of the essential plan nutrients and micronutrients advantageous to utilization as a soil amendment to improve soil productivity. In addition, in some embodiments the temperature of the catalytic bed 628 may be controlled and maintained at a desired temperature. For example, in one embodiment the catalytic bed 628 is maintained at a temperature of between 350° C. and 450° C.

In some embodiments, the calorific value of the hydrocarbon fuel generated as a result of the microwave-assisted pyrolysis of soapstock is higher than that of biodiesel. The density and dynamic viscosity of the pyrolytic fuel are, in some embodiments, similar to those of #0 diesel. In addition, the hydrocarbon fuel generated displays good low temperature fluidity, low freezing point and low cold filter plugging point.

Figure 7:
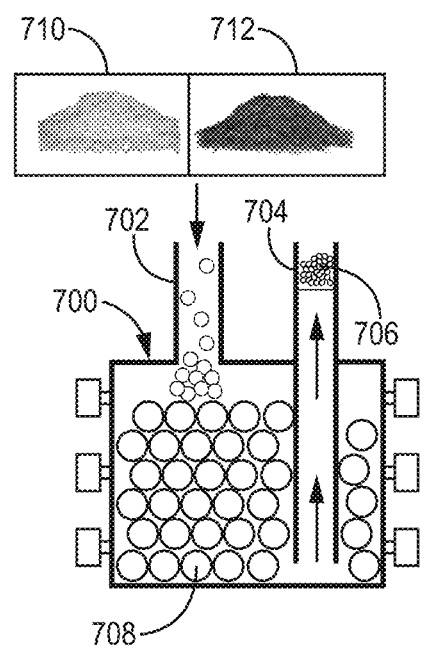
FIG. 7 illustrates a diagram of a pyrolysis reactor, according to some embodiments.

FIG. 7 is a diagram illustrating the MAP pyrolysis according to one embodiment in which a composite catalyst is utilized. For the sake of simplicity, the embodiment shown in FIG. 7 illustrates only the pyrolysis reactor 700, which includes an input 702 and an output 704. In contrast with the embodiment shown in FIG. 6, the embodiment shown in FIG. 7 utilizes a composite catalyst 706. For example, in one embodiment the composite catalyst is a ZSM-5/SiC composite. In one embodiment, the ZSM-5/SiC composite catalyst was formed via a microwave hydrothermal synthesis of ZSM-5 and silicon carbide foam ceramics.

Depending on the application, a plurality of different composite catalysts may be utilized. For example, in the embodiment shown in FIG. 7, the application is co-pyrolysis of soybean soapstock 710 and soybean straw 712 (referred to generally as a biomass). In some embodiments, a 1:1 ratio of soapstock to biomass is utilized, the ratio may be modified to have a greater ratio of soapstock or a greater ratio of biomass. The ratio of soapstock and biomass is provided to the pyrolysis reactor 700 via the input 702. The pyrolysis reactor 700 includes a microwave-absorbent bed 708, which is comprised of a plurality of microwave absorbent particles such as Silicon Carbide (SiC) or Zirconium Dioxide ($ZrO_2$). As described above, the size of the absorbent particles may be selected based on the application but may vary from a powder to centimeter scale. Likewise, the temperature of the microwave-absorbent bed 706 may be selected based on the application and may vary from 200° to over 1000°. In addition, because the composite catalyst 706 is located within the pyrolysis reactor 700 and includes a microwave-absorbent material (e.g., SiC), the temperature of the composite catalyst can be controlled to a desired temperature. For example, in the embodiment in which co-pyrolysis of soapstock and biomass is provided, the composite catalyst may be maintained at a temperature between 300° C. and 600° C., and in some embodiments between a temperature of between 400° C. and 500° C., and in some embodiments at a temperature of approximately 450° C.

The ratio of feed (e.g., combination of biomass and soapstock) to catalyst ratio may also be modified based on the application. For example, in some embodiments the ratio of biomass-soapstock to catalyst is 1:1. In other embodiments, the ratio of biomass-soapstock to catalyst is greater than 1:1 (e.g., 2:1). Experimental results utilizing the ZSM-5/SiC composite catalyst, at a catalytic temperature of 450° C. and a feed-to-catalyst ratio of 2:1 provided a proportion of alkanes, olefins, aromatics, and phenoxy compounds of approximately 7%, 4.5%, 74%, and 11%, respectively. One benefit identified in the above experiment was the ability to reuse the composiste catalyst a number of times without a significant decrease in catalytic activity.

Figure 8A:
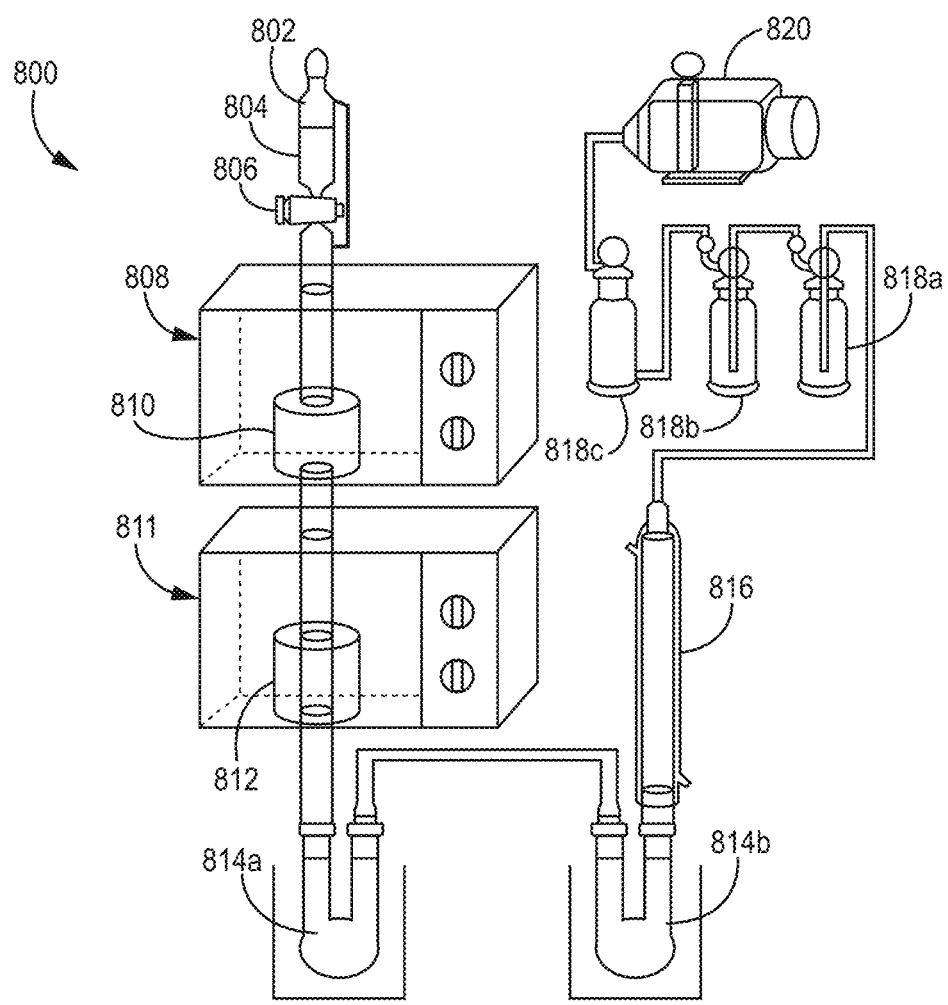
FIG. 8A illustrates a diagram of a two-stage microwave-assisted pyrolysis distillation system, according to some embodiments.
Figure 8B:
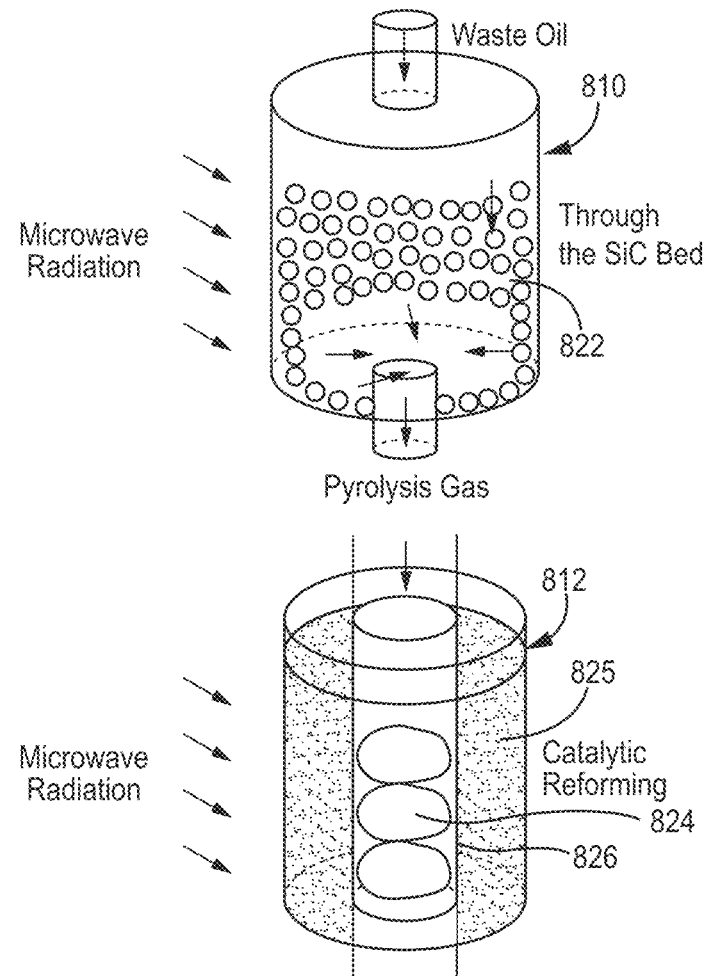
FIGS. 8B illustrates a diagram of a two-pyrolysis reactor, according to some embodiments.

FIGS. 8a and 8b are diagrams illustrating a two-stage microwave system 800 for providing MAP pyrolysis and catalytic reforming according to embodiments of the present invention. In the embodiment shown in FIG. 8a, two-stage microwave system 800 includes feeder flask 802, heating jacket 804, valve 806, first microwave system 808, pyrolysis reactor 810, second microwave system 811, catalytic reforming reactor 812, first and second condenser bottles 814a, 814b, condenser tube 816, gas drier flasks 818a, 818b, and 818c, and vacuum pump 820.

In contrast with previous embodiments, the embodiment shown in FIGS. 8a and 8b utilizes a two-stage microwave system. The first microwave system 808 includes a pyrolysis reactor 810, which as shown in FIG. 8b includes a microwave-absorbent bed 822. For example, the microwave-absorbent bed 822 may be comprised of a plurality of microwave-absorbent particles (e.g., SiC). The second microwave system 810 includes a catalytic reforming reactor 812, which as shown in FIG. 8b includes a composite catalyst bed 824 located within a quartz tube 826 configured to receive pyrolysis gas from the first microwave system 808. In this embodiment, the microwave-absorbent bed 822 may be maintained at a different temperature than the composite catalyst bed 824. In some embodiments, a microwave-absorbent material or fluid 825 (e.g., water, oil, etc.) surrounds the quartz tube 826 and converts microwave radiation to a desired temperature to increase the catalytic reforming process. In one embodiment, the composite catalyst is a microwave-assisted SiC-MCM41 composite catalyst applied to the pyrolysis gas of waste oil. The composite catalyst SiC-MCM41 utilizes the catalytic properties of both SiC and MCM41. For example, experimental results provide that maintaining the composite catalytic bed 824 at a temperature of between 350° C. and 450° C., and preferable at 400° C., with a catalyst to feed ratio of approximately 1:2, approximately 32% of C5-C12 hydrocarbons and 41% of mono-aromatics were obtained. In addition, the composite catalyst exhibits very good sustainability after several uses.

Figure 9:
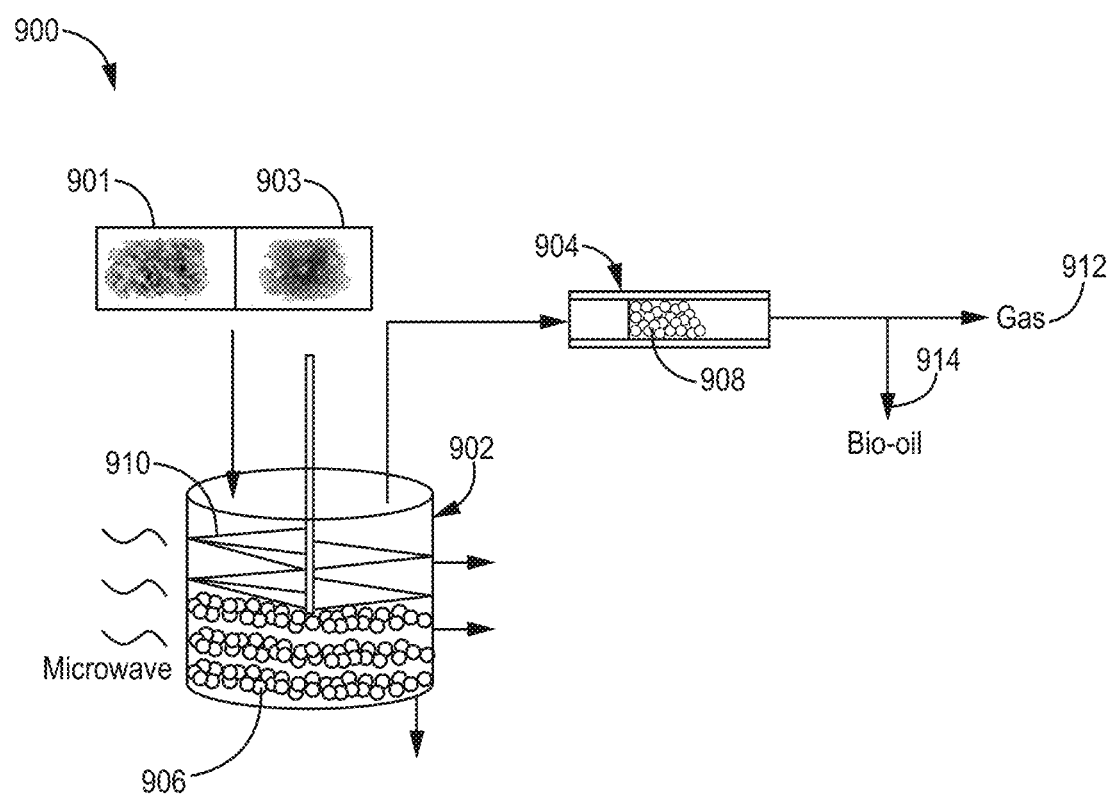
FIG. 9 illustrates a diagram of a microwave-assisted pyrolysis distillation system utilizing a catalyst bed, according to some embodiments.

FIG. 9 is a diagram illustrating a microwave assisted pyrolysis (MAP) system 900 according to embodiments of the present invention, For the sake of simplicity only the pyrolysis reactor 902, which includes a spiral stirring blade 910 and microwave-absorbent bed 906, and catalyst bed 908, retained within a heating blanket 904, is shown. Pyrolysis gas exiting the pyrolysis reactor 902 is provided to catalyst bed 908 retained within a heating blanket 904. As shown in FIG. 9, the utilization of heating blanket 904 allows the catalyst bed 908 to be maintained at a temperature separate from the microwave-absorbent bed 906.

In some embodiments, the system shown in FIG. 9 is utilized to implement continuous fast microwave catalytic co-pyrolysis of an input comprised of Alternanthera philoxeroides (labeled 901) and peanut soapstock (labeled 903). In some embodiments, HZSM-5 is utilized as a catalyst and SiC is utilized as the microwave-absorbent material In some embodiment, the stock-to-catalyst ratio was selected to be approximately 2:1. The fast microwave catalytic co-pyrolysis of the Alternanthera philoxeroides and peanut soapstock results in the production of a bio-oil. In some embodiments, the utilization of the catalyst increased the proportion of aromatics in the bio-oil yield in conducted experiments, which suggests that the philoxeroides had a synergistic effect on the peanut soapstock.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:

1. A method of producing a hydrocarbon fuel from a soapstock, the method comprising:
   supplying a pyrolysis reactor that includes a microwave absorbent bed susceptible to microwave irradiation;
   applying microwave energy to the pyrolysis reactor, wherein the microwave absorbent bed converts the microwave energy to thermal energy;
   supplying the soapstock to the microwave absorbent bed;
   supplying pyrolysis vapor generated by pyrolysis of the soapstock to a catalyst bed, wherein the catalyst bed includes a catalyst, and the pyrolysis vapor passes through the catalyst bed to be reformed and/or modified; and
   condensing vapor exiting the catalyst bed sufficient to collect the hydrocarbon fuel,
   wherein the catalyst includes a silicon carbide composite.

2. The method of claim 1, wherein the microwave absorbent bed includes a plurality of microwave absorbent particles.

3. The method of claim 2, wherein the plurality of microwave absorbent particles include carbon.

4. The method of claim 2, wherein the plurality of microwave absorbent particles include one or more of Silicon Carbide and Zirconium Dioxide.

5. The method of claim 1, wherein the microwave absorbent bed is maintained at a temperature of about 200° C. to about 1000° C.

6. The method of claim 1, wherein the silicon carbide composite catalyst includes one or more of a ZSM-5/SiC composite and an MCM-41/SiC composite.

7. The method of claim 1, wherein the silicon carbide composite catalyst is a SiC foam or monolith structure-based composite catalyst.

8. The method of claim 1, wherein the catalyst includes a HZSM-5 catalyst sufficient to increase the relative content of hydrocarbons in the hydrocarbon fuel.

9. The method of claim 1, wherein the catalyst bed is located within the pyrolysis reactor.

10. The method of claim 1, wherein the catalyst bed is located outside the pyrolysis reactor.

11. The method of claim 1, wherein the catalyst bed is maintained at a temperature of about 200° C. to about 1000° C.

12. The method of claim 1, wherein the catalyst bed includes a porous material sufficient to retain the catalyst bed within an output adapter.

13. The method of claim 1, wherein a relative content of hydrocarbons in the hydrocarbon fuel is dependent on a weight hourly space velocity of the soapstock and the catalyst.

14. The method of claim 13, wherein the weight hourly space velocity of the soapstock is greater than about 1.

15. The method of claim 1 further comprising producing a bio-char byproduct.

* * * * *